3,555,519
DIGITAL PROGRAMMING CONVERTER, REGISTER AND CONTROL SYSTEM
Sarkis Nercessian, Long Island City, N.Y., assignor to Forbro Design Corp., New York, N.Y., a corporation of New York
Continuation-in-part of application Ser. No. 764,083, Oct. 1, 1968. This application Mar. 18, 1969, Ser. No. 808,234
Int. Cl. G06f 5/00
U.S. Cl. 340—172.5     10 Claims

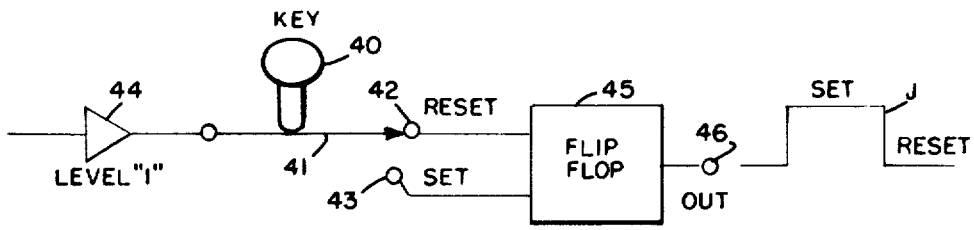
FIG 3
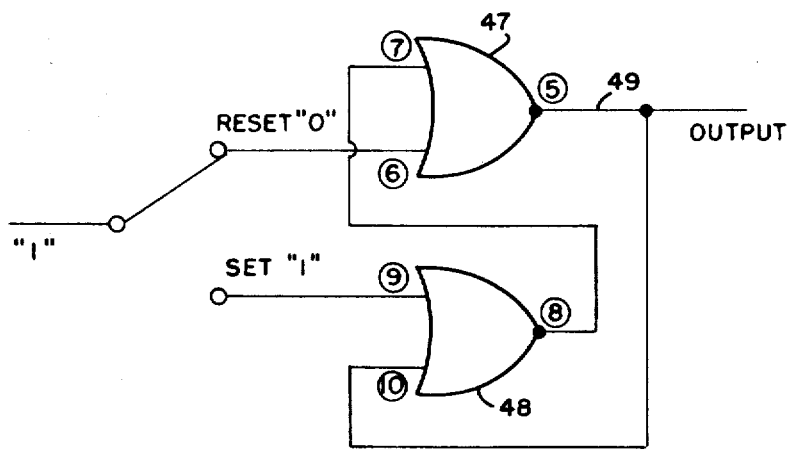
FIG 4
| RESET | SET | OUTPUT |
|-------|-----|------------|
| 0 | 0 | NO CHANGE |
| 1 | 0 | 0 |
| 0 | 1 | 1 |
| 1 | 1 | NOT ALLOWED |
FIG 5
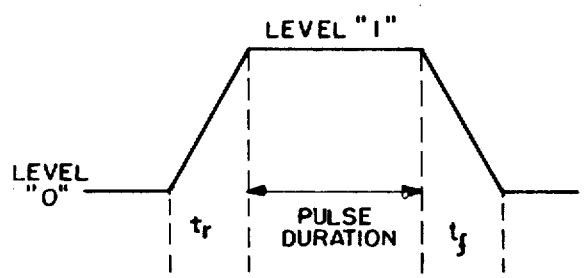
FIG 6
INVENTOR.
SARKIS NERCESSIAN
BY
*Alfred W. Barbee*
ATTORNEY

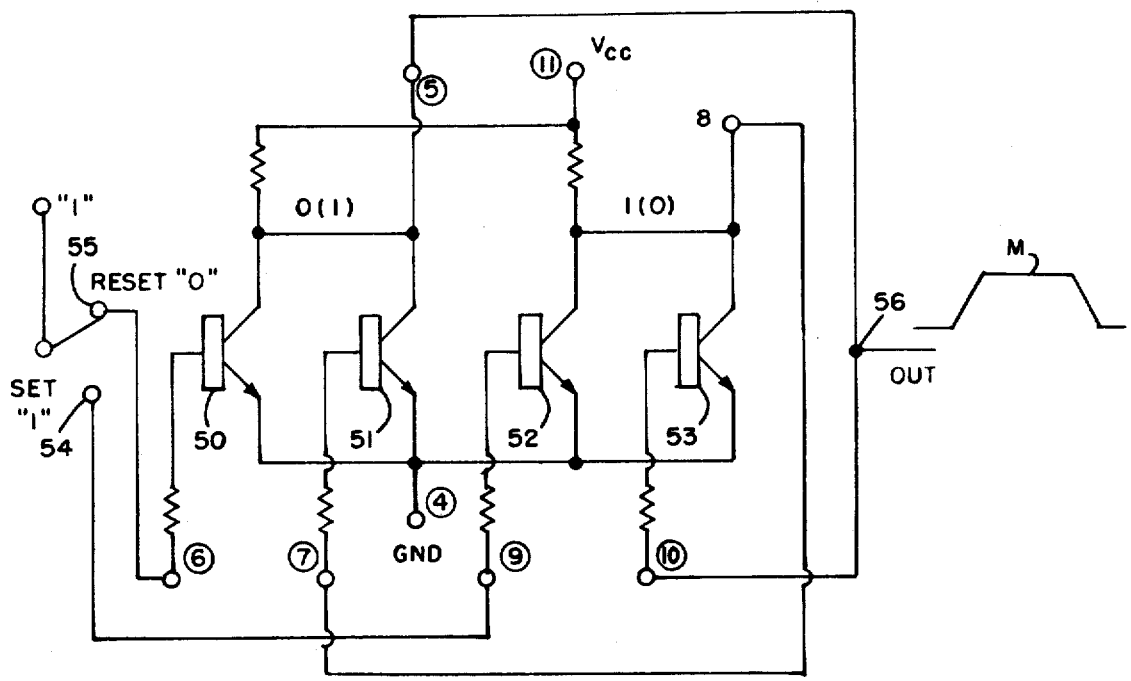
FIG. 7
FIG. 8 OUTPUT
FIG. 9 CONTACT
INVENTOR.
SARKIS NERCESSIAN
BY
ATTORNEY

United States Patent Office 3,555,519
Patented Jan. 12, 1971

ABSTRACT OF THE DISCLOSURE

The purpose of the present invention is to provide binary coded signals for controlling digitally programmable power supplies and for displaying the numerical value of such signals. Input signals may be parallel decimal or parallel binary (1-2-4-8) logic level signals (0 or 1). The input signals are accepted and processed a digit at a time. The system is particularly adapted to receive signals from a manual keyboard or other parallel presented signals which persist for a minimum predetermined time interval.

CROSS-REFERENCE TO RELATED APPLICATION

The present application is a continuation-in-part of the application entitled, "Method of the Means for Digital Programming of Regulated Power Supplies," filed on Oct. 1, 1968, and bearing Ser. No. 764,083.

BACKGROUND OF THE INVENTION (1) Field of the invention

The present invention may be classified in Class 328, Miscellaneous Electron Space Discharge Device Systems, and Subclass 103, Distribution and Combining Systems.

(2) Description of the prior art

No prior art, patented or unpantented, is known following the general system philosophy of the present invention.

SUMMARY

The purpose of the present invention is to provide an interface between a digital keyboard or other source of parallel coded information and a digitally programmable power supply; to operate one digit at a time, and to display the information digitally as it is processed. Parallel decimal coded information is converted to binary and presented in binary (1-2-4-8) form to a plurality of memory devices. A shift register gates the information a digit at a time into the memory devices in sequence. The memory devices provide three outputs; one to actuate relays in the programmable power supply; one which may be applied to a printer; and one which actuates a display device to display the digit programmed. Each time a digit signal is fed to the input of this system, a pulse is generated for actuating a sample and hold circuit in the power supply. For details of the above referred to relays and the sample and hold circuit, reference is made to the above referred to copending application.

BRIEF DESCRIPTION OF THE DRAWING

FIG. 3 is a block diagram showing how information presented by a switch closure is initially processed.
FIG. 4 is a block diagram of an "RS" flip-flop suitable for use in the circuit of FIG. 3.

FIG. 5 is a logic table applicable to the circuits of FIGS. 3 and 4.
FIG. 6 shows a typical output wave form of the flip-flops of FIGS. 3 and 4.
FIG. 7 is a detailed schematic circuit diagram of an "RS" flip-flop suitable for use in the circuit of FIGS. 3 and 4.
FIGS. 8 and 9 are diagrams explanatory of the operation of the flip-flop on circuit closures.

FIG. 1 is a block diagram of the preferred embodiment of the present invention. Input signals are applied from source 1 over an eleven wire line 2, accommodating either binary (1-2-4-8) or decimal (0-10) information, to the BCD converter 3. The output of converter 3 is binary (1-2-4-8) coded information applied over parallel wires 4 to the inputs of memory units 5, 6, 7 and 8. However, no information is entered in any of these memory units in the absence of a gating signal from one of memory input gates 9, 10, 11 and 12. The memory units provide three separate outputs; one to set the control relays of the power supply being programmed; one to supply signals to a printer; and one actuate a display. The displays 13, 14, 15 and 16 each are adapted to display one digit each representing the number being processed in the memory and, in fact, the number entered from source 1 into the system and the digit represented by the signals to the relays and printer. The signals from source 1 after processing in the BCD converter 3 and appearing at the memory inputs are gated into the memories a digit at a time by gates 9, 10, 11 and 12, which, in turn, are closed in sequence by shift register 17.

Figure 1:
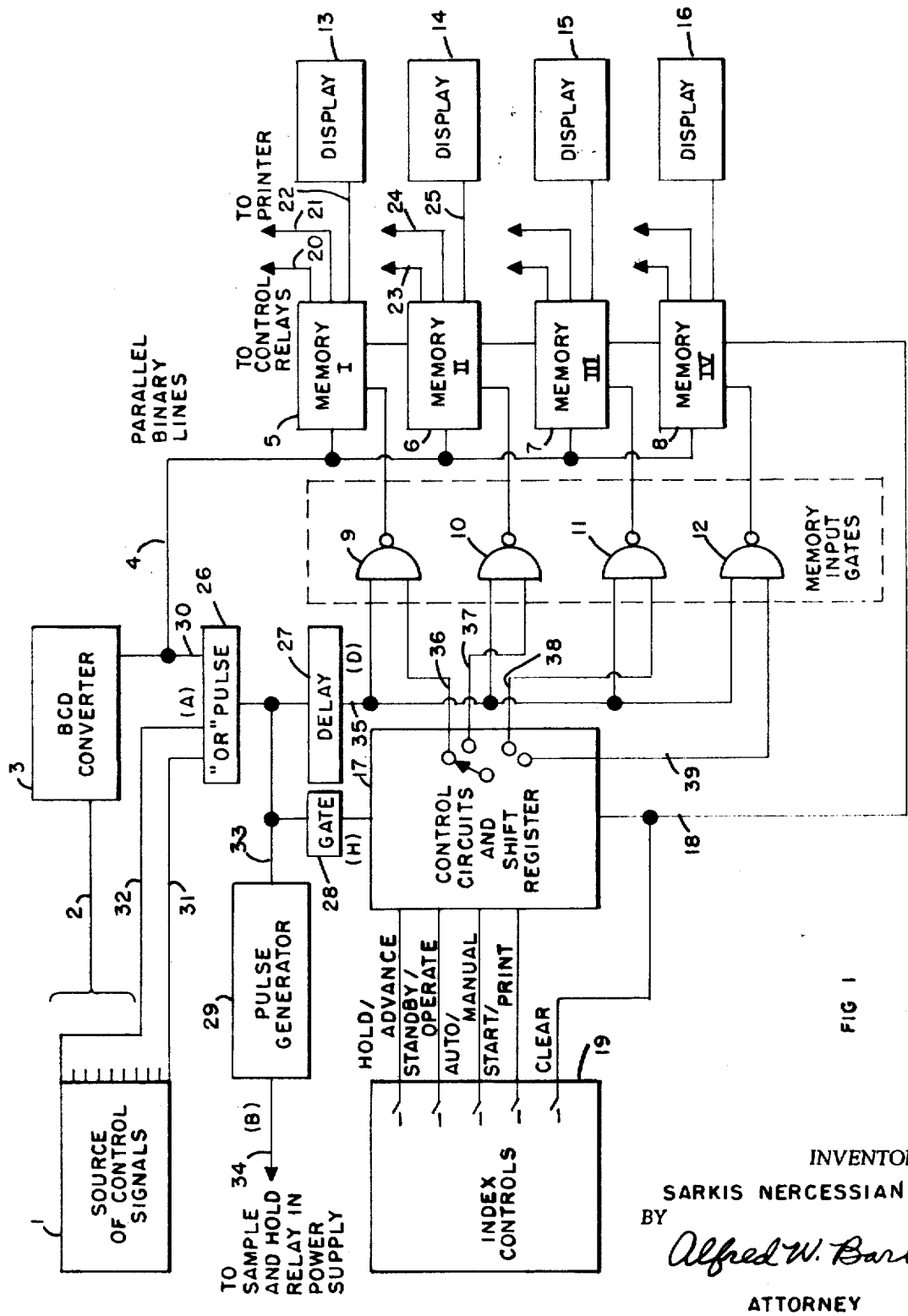
FIG. 1 is a block diagram of the preferred embodiment of the present invention.

Briefly, describing the operation of the system up to this point, first, it will be assumed that no information exists in the system, i.e., that it has been cleared by a pulse applied to the memory units over clear line 18 from index control unit 19. The first digit applied from source 1 is gated by gate 9 into memory 5 and corresponding output signals appear on relay line 20, printer line 21 and display line 22. The output signals affect their control, as will be more fully described below, and the digit is displayed on display 13. The second digit is similarly processed, gated by gate 10 (under the control of shift register 17) into memory unit 6, which, in turn, provides output control signals over relay line 23, printer line 24 and display line 25. This second digit is displayed by display 14. The third and fourth input digits are similarly processed, controlled and fed out by gates 11 and 12 and memory units 7 and 8, respectively, and are displayed on displays 15 and 16, respectively.

The seqeunce and timing empolyed in the operation briefly described above is accomplished with the aid of additional units including "OR" pulse generator 26, delay unit 27, and gate 28. The description will now be repeated showing how these units take part and using the timing diagram of FIG. 2 in order to clarify the explanation. The pulse diagrams of FIG. 2 are designated A through I. These letter designations have also been shown on FIG. 1 adjacent to the lines carrying these various pulses or changes in logic level. The positive or upper lines may be taken to represent logic "1" while the zero or base lines may be taken to represent logic "0."

Figure 2:
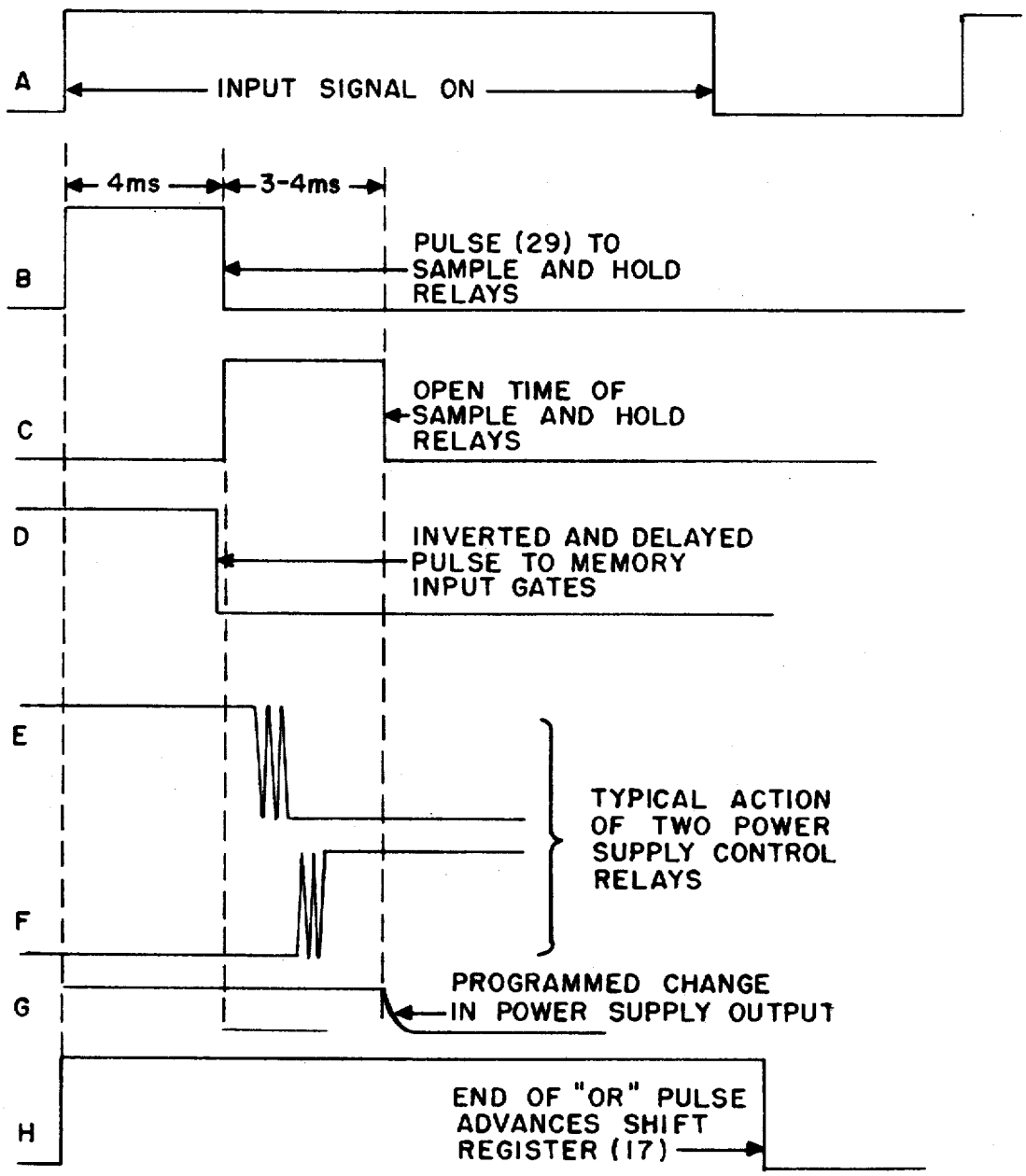
FIG. 2 is a timing diagram illustrating the way in which the invention operates.

Referring to FIGS. 1 and 2 taken together, a digit is applied from source 1. Since this digit must be a number from 1 through 9 or 0, a logic level will be found on one of the lines 1 through 9 resulting in a binary (1-2-4-8) output from converter 3 or a 0 or on over-range 10. This level change is represented by curve A of FIG. 2. The "OR" pulse generator 26 receives this level change A either from the output of converter 3 over lines 30 or from the 0 or 10 line over lines 32 or 31, respectively. In response to this input which signifies the application of a digit to the system, "OR" pulse generator 26 generates a pulse in effect repeating the pulse from A call it A'. Now, the power uspply being programmed requires two control signals for each digit, one to operate the sample and hold relay (preparing it to change the control relays) and the second to actuate the digital control relays. The output of the "OR" pulse generator 26 is applied over line 33 to pulse generator 29 which generates a pulse of the order of 4 milliseconds duration as shown in curve B and which in turn goes out over line 34 to the power supply being programmed. A 4 millisecond time interval is provided to allow the sample and hold relay to open and its operation is illustrated by curve C. The output A' of the "OR" pulse generator 26 is delayed by about 4 milliseconds by delay unit 27 and the pulse is inverted resulting in the negative going pulse D. Since the power supply is now ready to receive a new digit, this delayed pulse D is applied over line 35 to gates 9, 10, 11, and 12. Each memory input gate 9, 10, 11 and 12 has two input lines, one branching from line 35, the output of delay unit 27, and the other one of lines 36, 37, 38 and 39 from shift register 17. These input gates provide an output to actuate the corresponding memory 5, 6, 7 or 8 only when an input exists on both input lines. The appropriate gate as determined by the shift register 17, opens and the information at the corresponding memory input at that instant produces a corresponding digital output to control relays, printer and display unit. Curves E and F illustrate the operation of two of the control relays including contact bounce. It will be seen that the relay operation including any bounce, whether it be on opening or closing of the contacts, takes place during the interval (curve C) during which the sample and hold relay is open. When the sample and hold relay closes at the end of the interval, the relay switching has been completed and the power supply is smoothly programmed to its new value as illustrated by curve G. When the signal from source 1 is removed or ceases, the trailing edge of the pulse from "OR" pulse generator 26 is selected by gate 28, see curve H, and is applied to shift register 17 causing it to advance its output gate control over one of lines 36, 37, 38 and 39 to the next in sequence, preparing the succeeding gate to process the next digit as just described above.

FIG. 1 also shows an index control unit 19 for either clearing the memories over line 18 or initiating in control circuits associated with shift register 17 functions including "Hold/Advance," "Standby/Operate," "Auto/Manual" and "Start/Print."

Briefly, the functions performed through the medium of index controls unit 19 operate as follows: The switch actuating the clear function applied to the memories over line 18 applies a pulse which clears all information stored in the memories returning them to 0, returns the shift register to the first (most significant) digit, displays 0 in all display units and erases the decimal point if any. The start/print switch, when the index control is switched to manual (auto/manual switch explained below), clears the memories and displays and permits a new program to be entered. When the index control is switched to automatic, the start/print switch generates a print command for the printer to print the information then existing in the register. A print command signal is also automatically generated with the entry of a fourth digit in a program and simultaneously with cycling the index from the fourth digit to the first digit. The auto/manual switch when in automatic position provides that after a complete program of four digits, the next input information will program the first digit erasing the previous information and inserting the new. The audio/manual switch when in manual position permits manual indexing only to a program of four input digits and then the system inhibits itself to prevent any error in attempting to enter a program longer than four. The standby/operate switch when in standby position inhibits the ring counter of the shift register, the digit and decimal point memories permitting only the clearing function to be performed. The hold/advance switch when in hold position, stops the ring counter of the shift register so that any information entered goes to only one and the same memory unit and display.

FIG. 3 is a block diagram showing how information presented by a switch closure is processed so that contact bounce effects are eliminated from the input pulse to the register. Information is entered manually by depressing an appropriate key or push-button 40 thereby switching an arm 41 from reset contact 42 to set contact 43. An input level "1" is applied to arm 41 from a suitable source of logic "1" (in this particular instance a positive voltage between 1 and 3 volts). Contacts 42 and 43 are connected to the input of a flip-flop 45 and flip-flop 45 provides an output at output terminal 46 as shown in curve J, i.e., a positive output for a "set" input and zero output for a "reset" input. One suitable type of flip-flop comprises two gates 47 and 48 as shown in block form in FIG. 4 and in detail in FIG. 7. These two gates comprise an "RS" type flip-flop in accordance with the description of FIG. 3, i.e., an output at terminal 49 which is in accordance with the diagram J of FIG. 3.

FIG. 5 is a logic or truth table showing the output as it depends on 0 or 1 logic levels applied to the set and reset inputs of an "RS" flip-flop as shown in FIGS. 4 and 7.

FIG. 6 shows further that while diagram J of FIG. 3 has vertical rise and fall, actually in any practical flip-flop there is a finite rise time $t_r$ and fall time $t_f$ with the pulse duration taken as the time during which the output is at full logic level 1.

FIGS. 8 and 9 are plotted to have a common vertical axis, wherein FIG. 8, K represents the output pulse of the flip-flop and FIG. 9, L shows how a mechanical contact on closing and on opening may bounce and make imperfect contact while still producing the desired output K (FIG. 8). This is the case since once the flip-flop is set or reset, it holds until the opposite input is applied. In other words an imperfect and bouncing contact made by the key switch at, say set, flips the flip-flop which holds until it is forced to return by closing the opposite key switch contact.

FIG. 7 is a detailed schematic of one form of "RS" flip-flop which has been found suitable for the switching function described above. This is an integrated circuit device which employs four transistors to provide logic output in response to logic 1 on the input set switch contact 54 and logic 0 in response to logic 1 on the input reset contact 55. When logic 1 is applied to the base of transistor 52, it conducts pulling down its collector and the base of transistor 51. Transistor 51 is thus rendered nonconducting and its collector goes high rendering transistor 53 conducting and placing a positive or logic 1 pulse on output 56. Transistors 50 and 51 are put out of conduction and the circuit latches in this condition holding the logic 1 output, in spite of any bounce at contact 54, until the input is applied to reset contact 55. When logic 1 is applied to reset contact 55, the conduction states of the four transistors reverse, transistors 50 and 51 conducting and transistors 52 and 53 nonconducting. This condition also latches and puts a logic 0 on output terminal 56, again a condition not affected by bounce or poor contact at contact 55.

Figure 10:
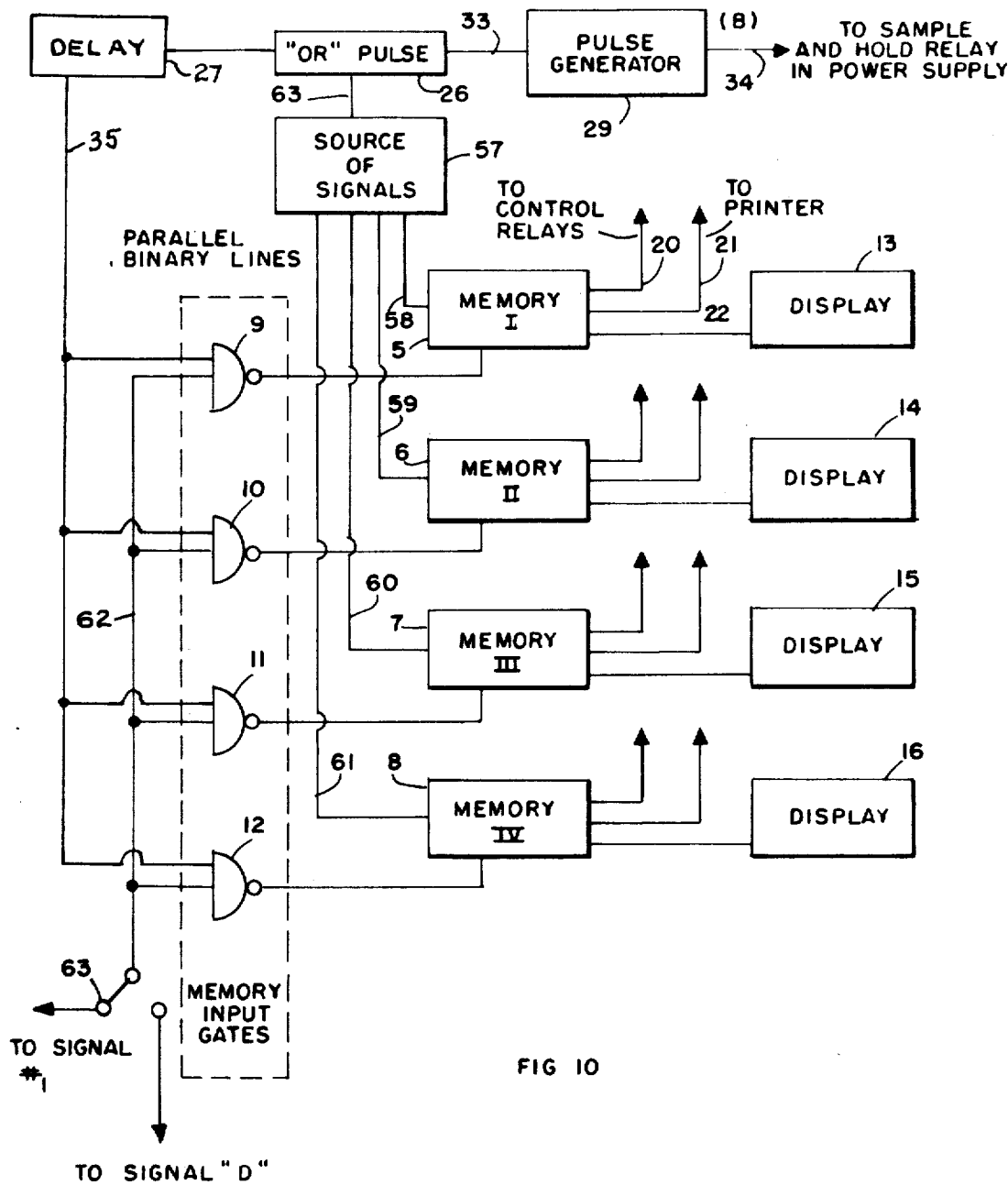
FIG. 10 is a block diagram of the memory control and display system adapted for direct input of parallel binary coded information.

FIG. 10 is a block diagram of the memory control and display system of the present invention as adapted to be programmed directly by a parallel binary input. In this mode of operation the binary coded digital converter and shift register are not used. A source 57 of parallel binary information is applied in parallel over lines 58, 59, 60 and 61 to memory units 5, 6, 7 and 8, respectively. A logic 1 signal through switch 63 and over line 62 to the inputs of all memory input gates 9, 10, 11 and 12 and thereby holding these gates open to receive the binary information applied simultaneously to all the memory units. The memory units all function simultaneously; to supply commands to the control relays over lines 20, 23 and so on; to supply printing commands to all printers over lines 21, 22 and so on; and signals to all display units 13, 14, 15 and 16 over lines 22, 25 and so on. The source of signals 57 provides in addition to the parallel binary signals, a data pulse which, in effect, says, "This is the data to be used at this instant." This data pulse is fed over line 63 to OR pulse generator 26 which sends a signal over line 33 to pulse generator 29 which in turn provides a pulse over line 34 to the Sample and Hold relays in the power supply being programmed, as described above in connection with FIG. 1.

I claim:

1. In a digital programming converter, register and control system, the combination of;

a source of parallel decimal coded signals;

means for converting parallel decimal coded signals to parallel binary coded signals;

memory means for storing each digit of said binary coded signals;

gate means for each of said memory means for releasing said binary coded signals from said converting means to said memory means;

means for generating a change of level signal in response to input signals to said converting means;

means for delaying said change of level signal;

means for inverting said change of level signal;

shift register means responsive to said inverted change of level signal for opening said gating means one at a time to pass said delayed change of level signal to a memory means for gating said memory means to accept a digit of said binary coded signals;

a display means coupled to each of said memory means for displaying said last said digit;

memory output means for passing a binary coded signal to a device to be controlled;

and a pulse generator responsive to said change of level signal for priming a device to be controlled to respond to said binary coded signal from said memory output means.

2. A digital programming converter, register and control system, as set forth in claim 1;

wherein the input to said change of level generating means is on "OR" circuit coupled to the output of said converting means and to a portion of the input circuit of said converting means;

whereby any input digit including zero and ten will provide said change of level signal.

3. A digital programming converter, register and control system, as set forth in claim 1;

wherein said display means is adapted to display any digit from zero through nine in decimal fashion.

4. A digital programming converter, register and control system, as set forth in claim 1;

and including means for clearing said memories.

5. A digital programming converter, register and control system, as set forth in claim 1;

and including additional memory output circuit means for feeding digital information to a printing means.

6. A digital programming converter, register and control system, as set forth in claim 1;

wherein said source of parallel decimal coded signals includes single pole, double throw switch means for applying logic signals to said converting means;

and flip-flop means connected between said switch means and said converting means for providing positive switching of said logic signals and eliminating contact bounce produced ambiguity in said signals at said converting means.

7. A digital programming converter, register and control system, as set forth in claim 1;

wherein said flip-flop means comprise RC integrated circuits.

8. A digital programming converter, register and control system, as set forth in claim 1;

wherein said memory output means is adapted to provide relay energizing current for actuating a relay means in a device to be controlled.

9. A digital programming converter, register and control system, as set forth in claim 1;

and including control means coupled to said shift register means for modifying the operation of said shift register in accordance with a predetermined control function.

10. In a digital programming converter, register and control system, the combination of;

a source of parallel binary coded signals;

a memory means for storing said signals;

gate means for releasing said stored signals to means to be controlled;

means for receiving a data pulse associated with said binary coded signals;

means for generating a pulse for activating said means to be controlled responsive to said data pulse;

means for delaying said data pulse for a predetermined interval of time;

and means for applying said delayed pulse to said gate means, whereby said stored signals are released a predetermined interval of time later than said activating pulse.

References Cited

UNITED STATES PATENTS

| | | | |
|---|---|---|---|
| 3,239,832 | 3/1966 | Renard | 340—347 |
| 3,334,335 | 8/1967 | Brick et al. | 340—172.5 |
| 3,340,524 | 9/1967 | Rinaldi | 340—347X |
| 3,350,708 | 11/1967 | Adler | 340—347 |
| 3,400,388 | 9/1968 | Blank | 340—347X |

OTHER REFERENCES

D. E. Fisk: Code Converter Using a Table Look-Up and a Dynamic Compare, IBM Technical Disclosure, vol. 8, No. 1, June 1965.

PAUL J. HENON, Primary Examiner

R. F. CHAPURAN, Assistant Examiner